United States Patent
Ren et al.

(10) Patent No.: US 12,256,349 B2
(45) Date of Patent: Mar. 18, 2025

(54) SIGNAL TRANSMISSION METHOD AND DEVICE, SIGNAL RECEPTION METHOD AND DEVICE, AND TERMINAL

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN); Fangchen Cheng, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 384 days.

(21) Appl. No.: 17/775,290

(22) PCT Filed: Nov. 4, 2020

(86) PCT No.: PCT/CN2020/126363
§ 371 (c)(1),
(2) Date: May 7, 2022

(87) PCT Pub. No.: WO2021/088841
PCT Pub. Date: May 14, 2021

(65) Prior Publication Data
US 2022/0408385 A1 Dec. 22, 2022

(30) Foreign Application Priority Data
Nov. 8, 2019 (CN) .......................... 201911086762.7

(51) Int. Cl.
*H04W 56/00* (2009.01)
*H04W 92/18* (2009.01)

(52) U.S. Cl.
CPC .......... *H04W 56/001* (2013.01); *H04W 92/18* (2013.01)

(58) Field of Classification Search
CPC ........................... H04W 92/18; H04W 56/001
(Continued)

(56) References Cited

U.S. PATENT DOCUMENTS

| | | | |
|---|---|---|---|
| 12,041,006 B2 * | 7/2024 | Liu | .................. H04W 72/0446 |
| 2019/0149365 A1 | 5/2019 | Chatterjee et al. | |

(Continued)

FOREIGN PATENT DOCUMENTS

| | | |
|---|---|---|
| CN | 108810983 A | 11/2018 |
| CN | 109150448 A | 1/2019 |

(Continued)

OTHER PUBLICATIONS

International Search Report for PCT/CN2020/126363 issued on Feb. 3, 2021, and its English translation provided by WIPO.
(Continued)

*Primary Examiner* — Peter G Solinsky
(74) *Attorney, Agent, or Firm* — Ladas & Parry, LLP (57) ABSTRACT

Signal transmission method and device, signal reception method and device and a terminal are provided. The signal transmission method includes: transmitting P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH.

17 Claims, 5 Drawing Sheets

Receiving P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH (58) Field of Classification Search
USPC .......................................................... 370/350
See application file for complete search history.

(56) References Cited

U.S. PATENT DOCUMENTS

| | | | |
|---|---|---|---|
| 2019/0215790 | A1 | 7/2019 | Kim et al. |
| 2019/0387488 | A1 | 12/2019 | Wang et al. |
| 2020/0068420 | A1 | 2/2020 | Tao et al. |
| 2020/0068514 | A1 | 2/2020 | Liu et al. |
| 2021/0037493 | A1* | 2/2021 | Gulati ................ H04B 17/318 |
| 2021/0176687 | A1* | 6/2021 | Ko ........................ H04L 5/005 |
| 2022/0225432 | A1* | 7/2022 | Wang ............... H04W 74/0866 |
| 2022/0286985 | A1* | 9/2022 | Ren .................. H04L 27/26025 |

FOREIGN PATENT DOCUMENTS

| | | |
|---|---|---|
| CN | 109257957 A | 1/2019 |
| CN | 110249666 A | 9/2019 |
| WO | 2019098769 A1 | 5/2019 |

OTHER PUBLICATIONS

Written Opinion for PCT/CN2020/126363 issued on Feb. 3, 2021, and its English translation provided by WIPO.

International Preliminary Report on Patentability for PCT/CN2020/126363 issued on May 10, 2022, and its English translation provided by WIPO.

"On Initial Access and Mobility for NR-U," 3GPP TSG RAN WG1 Meeting #94, R1-1809090, Gothenburg, Sweden, Aug. 20-24, 2018, Agenda Item: 7.2.2.4.2, Source: InterDigital Inc, all pages.

"Discussion on initial access and mobility in NR-U," 3GPP TSG RAN WG1 Meeting #97, R1-1906375, Reno, USA, May 13-17, 2019, Agenda Item: 7.2.2.2.2, Source: Spreadtrum Communications, all pages.

"Discussion on synchronization mechanism for NR V2X," 3GPP TSG RAN WG1 Meeting #98bis, R1-1910008, Chongqing, China, Oct. 14-20, 2019, Agenda Item: 7.2.4.3, Source: Spreadtrum Communications, all pages.

First Office Action for Chinese Patent Application 201911086762.7 issued on Sep. 8, 2021 and its English translation provided by the global dossier.

"Discussion on synchronization mechanism in NR V2X," 3GPP TSG RAN WG1 #97, R1-1906462, Reno, USA, May 13-17, 2019, Source: ZTE, Sanechips, Agenda item: 7.2.4.3, all pages.

"Sidelink synchronization mechanisms for NR V2X," 3GPP TSG RAN WG1 Meeting #98bis, R1-1910057, Chongqing, China, Oct. 14-20, 2019, Agenda Item: 7.2.4.3, Source: Huawei, HiSilicon.

"Discussion on synchronization mechanism in NR V2X," 3GPP TSG RAN WG1 #98bis, R1-1910298, Chongqing, China, Oct. 14-20, 2019, Source: ZTE, Sanechips, Agenda item: 7.2.4.3, all pages.

"Sidelink synchronization mechanism in NR V2X," 3GPP TSG RAN WG1 #98bis, R1-1910330, Chongqing, China, Oct. 14-18, 2019, Source: CATT, Agenda Item: 7.2.4.3, all pages.

Extended European Search Report for European Patent Application 20885790.4 issued on Dec. 2, 2022.

"The composition of SS blocks and SS burst sets," 3GPP TSG RAN WG1 Meeting #89, R1-1707043, Hangzhou, China, May 15-19, 2017, Source: ZTE, Agenda Item: 7.1.1.1.2, all pages.

"SS Burst Set Composition," 3GPP TSG RAN WG1 NR Ad-Hoc#2, R1-1710502, Qingdao, P.R. China Jun. 27-30, 2017, Source: Intel Corporation, Agenda item: 5.1.1.1.2, all pages.

\* cited by examiner

Transmitting P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH ⟋11

SIGNAL TRANSMISSION METHOD AND DEVICE, SIGNAL RECEPTION METHOD AND DEVICE, AND TERMINAL

CROSS-REFERENCE TO RELATED APPLICATIONS

This application is a U.S. national phase application of a PCT Application No. PCT/CN2020/126363 filed on Nov. 4, 2020, which claims priority to Chinese Patent Application No. 20/1911086762.7 filed in China on Nov. 8, 2019, the disclosures of which are incorporated herein by reference in their entireties.

TECHNICAL FIELD

The present disclosure relates to the field of communications technology, in particular, relates to a signal transmission method, a signal transmission device, a signal reception method, a signal reception device, and a terminal.

BACKGROUND

In a fifth generation (5G) New Radio (NR) vehicle to everything (V2X) system, a terminal and another terminal perform direct communication therebetween by using a PC5 (Sidelink) interface. Prior to transmission of service data, it is first necessary to establish synchronization between the two terminals at the PC5 (Sidelink) interface. A method of establishing synchronization is that a terminal A sends a signal for synchronization and broadcast, the other terminal B receives the signal for synchronization and broadcast sent by the terminal A. and once the terminal B receives and demodulates successfully, the two terminals can establish synchronization and prepare for a next step of direct communication.

A synchronization signal through a NR UU interface is carried by a Synchronization Signal Block (SSB). Each slot (Slot) carries 2 SSB blocks and there is no time-domain repetition mechanism for a PSS (Primary Synchronization Signal) signal and a SSS (Secondary Synchronization Signal) signal.

In order to complete beam measurement and beam selection, Beam-Sweeping needs to be performed on the SSB of the NR UU interface. The beam-sweeping means that a base station sends the SSB in all possible beam directions once in a certain time interval (5 ms). Then, the terminal measures a signal strength of the SSB for each beam and reports a measurement result to the base station, and the base station selects a most suitable beam according the measurement result reported by the terminal, to transmit data to the terminal. Depending on different carrier frequencies and different subcarrier spacings, the number of directions that need to be beam-swept varies. The maximum values of SSB beam-sweeping candidate directions in different carrier frequency ranges are respectively 4/8/64, and the number of actually configured beam-sweeping directions cannot exceed this maximum value.

In the related Long Term Evolution (LTE) V2X technology, at most three synchronization subframes are configured every 160 ms on the Sidelink, and a User Equipment (UE) transmits and receives Sidelink synchronization signals and broadcast information on these synchronization subframes, and the UE does not perform beam-sweeping when transmitting and receiving synchronization signals and broadcast information on these synchronization subframes.

With emergence of 5G NR, a V2X technology is further developed to meet needs of new application scenarios. The 5G NR supports larger bandwidths, flexible configuration of subcarrier spacings, and transmission of synchronization signals and broadcast information in forms of SSB beam-sweeping or beam repetition. This brings a new challenge to a design of a structure of a NR V2X physical layer. An original scheme of transmission and reception of the synchronization signal and the broadcast information performed by the UE on the synchronization subframe needs to be redesigned. A mechanism of SSB beam-sweeping or beam repetition needs to be introduced to meet requirements of the NR V2X.

The introduction of SSB beam-sweeping or beam repetition in the NR V2X will result in multiple synchronization signal blocks being transmitted in one synchronization period, at most 64 synchronization signal blocks need to be sent or received in one synchronization period. If continuous synchronization resources are configured to continuously send the 64 synchronization signal blocks, a large latency may be incurred, which is adverse to real-time transmission of V2X service data.

SUMMARY

Embodiments of the present disclosure provide a signal transmission method, a signal reception method, a signal transmission device, a signal reception device, and a terminal, so that the terminal can detect a synchronization signal block set at a preset time-domain location, which improves a success rate of detecting a synchronization signal block.

In order to solve the above technical problems, the embodiments of the present disclosure provide following technical solutions.

A signal transmission method performed by a terminal includes transmitting P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH.

Optionally, time intervals between two adjacent groups are same.

Optionally, when the time-domain location of the at least one of the SSBs is preconfigured, preconfigured information of the time-domain location includes at least one of the following parameters: time intervals between two adjacent SSBs in a same group; time intervals between all SSBs in a same group and a first SSB in the group; time intervals between all SSBs and a first SSB in a synchronization period; wherein the time interval is Ti slots or Ti milliseconds, Ti is greater than or equal to 0.

Optionally, the time intervals between two adjacent SSBs in the same group are same.

Optionally, the slot includes at least one of following: a physical slot; an air-interface slot; an uplink slot; a sidelink slot.

Optionally, at least one of following parameters are preconfigured: a quantity of SSBs contained within each group; a value of P; a value of Q.

Optionally, quantities of SSBs contained within different groups are same.

Optionally, at least one of following parameters is determined according to at least one of a subcarrier spacing SCS used by the terminal, a frequency range, and information carried by the PBCH: a time-domain location of a SSB; a quantity P of SSBs sent in a synchronization period; a time interval between two groups; a quantity of SSBs contained within each group; a quantity Q of groups contained within a synchronization period.

Optionally, the information carried by the PBCH includes: information carried by a Demodulation Reference Signal DMRS corresponding to the PBCH, or information carried by a payload of the PBCH.

Optionally, the SSB is a sidelink synchronous signal block S-SSB, the PBCH is a physical sidelink broadcast channel PSBCH, the synchronous period is a sidelink synchronous period.

The embodiments of the present disclosure further provides a signal reception method performed by a terminal. The method includes: receiving P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH.

Optionally, time intervals between two adjacent groups are same.

Optionally, when the time-domain location of the at least one of the SSBs is preconfigured, preconfigured information of the time-domain location includes at least one of the following parameters: time intervals between two adjacent SSBs in a same group; time intervals between all SSBs in a same group and a first SSB in the group; time intervals between all SSBs and a first SSB in a synchronization period; wherein the time interval is Ti slots or Ti milliseconds, Ti is greater than or equal to 0.

Optionally, the time intervals between two adjacent SSBs in the same group are same.

Optionally, the slot includes at least one of following: a physical slot; an air-interface slot; an uplink slot; a sidelink slot.

Optionally, at least one of following parameters are preconfigured: a quantity of SSBs contained within each group; a value of P; a value of Q.

Optionally, quantities of SSBs contained within different groups are same.

Optionally, at least one of following parameters is determined according to at least one of a subcarrier spacing SCS used by the terminal, a frequency range, and information carried by the PBCH: a time-domain location of a SSB; a quantity P of SSBs sent in a synchronization period; a time interval between two groups; a quantity of SSBs contained within each group; a quantity Q of groups contained within a synchronization period.

Optionally, the information carried by the PBCH includes: information carried by a Demodulation Reference Signal DMRS corresponding to the PBCH, or information carried by a payload of the PBCH.

Optionally, the SSB is a sidelink synchronous signal block S-SSB, the PBCH is a physical sidelink broadcast channel PSBCH, the synchronous period is a sidelink synchronous period.

The embodiments of the present disclosure further provide a terminal. The terminal includes: a transceiver, a processor, a memory storing a computer program executable by the processor; wherein, when the computer program is executed by the processor, the processor implements following: transmitting P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH.

Optionally, when the time-domain location of the at least one of the SSBs is preconfigured, preconfigured information of the time-domain location includes at least one of the following parameters: time intervals between two adjacent SSBs in a same group; time intervals between all SSBs in a same group and a first SSB in the group; time intervals between all SSBs and a first SSB in a synchronization period; wherein the time interval is Ti slots or Ti milliseconds, Ti is greater than or equal to 0.

Optionally, at least one of following parameters is determined according to at least one of a subcarrier spacing SCS used by the terminal, a frequency range, and information carried by the PBCH: a time-domain location of a SSB; a quantity P of SSBs sent in a synchronization period; a time interval between two groups; a quantity of SSBs contained within each group; a quantity Q of groups contained within a synchronization period.

The embodiments of the present disclosure further provide a signal transmission device. The signal transmission device includes: a transceiver module, configured to transmit P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH.

The embodiments of the present disclosure further provide a terminal. The terminal includes a transceiver, a processor, a memory storing a computer program executable by the processor; wherein, when the computer program is executed by the processor, the processor implements following: receiving P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH.

Optionally, when the time-domain location of the at least one of the SSBs is preconfigured, preconfigured information of the time-domain location includes at least one of the following parameters: time intervals between two adjacent SSBs in a same group; time intervals between all SSBs in a same group and a first SSB in the group; time intervals between all SSBs and a first SSB in a synchronization period; wherein the time interval is Ti slots or Ti milliseconds, Ti is greater than or equal to 0.

Optionally, at least one of following parameters is determined according to at least one of a subcarrier spacing SCS used by the terminal, a frequency range, and information carried by the PBCH: a time-domain location of a SSB; a quantity P of SSBs sent in a synchronization period; a time interval between two groups; a quantity of SSBs contained within each group; a quantity Q of groups contained within a synchronization period.

The embodiments of the present disclosure further provide a signal reception device. The signal reception device includes: a transceiver module, configured to receive P synchronous signal blocks SSBs in a synchronous period, wherein the P SSBs are divided into Q groups, any of the Q groups includes at least one SSB, both P and Q are positive integers greater than or equal to 1; when a synchronization period includes at least two SSBs, a time-domain location of at least one of the SSBs is preconfigured or carried through a physical broadcast channel PBCH.

The embodiments of the present disclosure further provide a processor-readable storage medium, wherein the processor-readable storage medium stores instructions, and when the instructions are executed by a processor, the processor executes the method described above.

The beneficial effects of the embodiments of the present disclosure are as follow.

In the above embodiments of the present disclosure, the configuration information of the time-domain location of the synchronization signal block SSB set may be notified to the terminal through pre-configuration and/or through being carried by a physical broadcast channel, so that the terminal receives the synchronization signal block SSB set in the time-domain location and acquires synchronization information in a soft-combining manner. The terminal can detect the synchronization signal block set at the preset time-domain location though the method, which improves the success rate of detecting the synchronization signal block, meanwhile, the synchronization signal block set discontinuously sent avoids introducing a large service delay, thereby improving the synchronization success rate of the sidelink and reducing the transmission delay.

DETAILED DESCRIPTION

Exemplary embodiments of the present disclosure will be described in details below with reference to accompanying drawings. While the exemplary embodiments of the present disclosure are shown in the drawings, it should be understood that the present disclosure may be embodied in various forms and should not be limited by the embodiments set forth herein. On the contrary, these embodiments are provided so that the present disclosure will be more thoroughly understood, and will fully convey the scope of the present disclosure to those skilled in the art.

Figure 1:
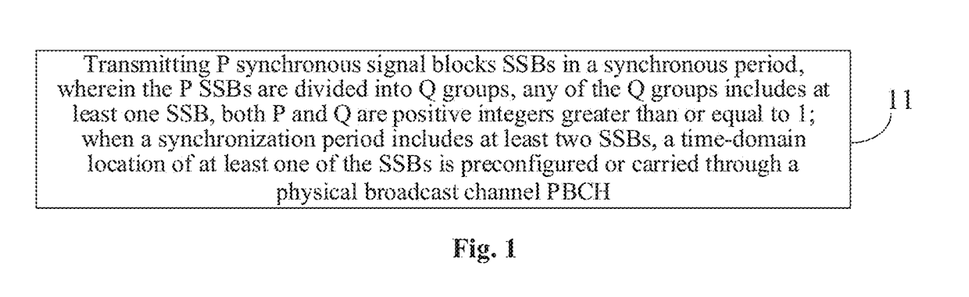
FIG. 1 is a schematic flowchart of a signal transmission method in some embodiments of the present disclosure.

As shown in FIG. 1, embodiments of the present disclosure provide a signal transmission method applied to a terminal. The method includes a step 11.

Step 11: transmitting P synchronous signal blocks SSBs in a synchronous period, wherein the P SSBs are divided into Q groups, any of the Q groups includes at least one SSB, P and Q are both positive integers greater than or equal to 1. When a synchronization period includes at least two SSBs, the time-domain location of at least one SSB is preconfigured or carried through a Physical Broadcast Channel (PBCH).

In this embodiment, optionally, the SSB is a Sidelink Synchronous Signal Block (S-SSB), the PBCH is a Physical Sidelink Broadcast Channel (PSBCH), the synchronous period is a sidelink synchronous period. Optionally, the P can be preconfigured, the Q can be preconfigured. Each group here is a burst; all S-SSBs sent in a synchronization period constitute a burst set.

In the embodiments of the present disclosure, configuration information of a time-domain location of a synchronization signal block SSB set may be notified to the terminal through a pre-configured method and/or through being carried by a physical broadcast channel, so that the terminal receives the synchronization signal block SSB set in the time-domain location and acquires synchronization information in a soft-combination manner. The terminal can detect the synchronization signal block set at a preset time-domain location though the method, which improves a success rate of detecting the synchronization signal block, meanwhile, the synchronization signal block set discontinuously sent avoids a large service delay, thereby improving the synchronization success rate of the sidelink and reducing the transmission delay.

A specific implementation method of this embodiment is as follows: transmitting P (P greater than or equal to 1) S-SSBs in a synchronization period, and P S-SSBs are divided into Q groups (Q greater than or equal to 1), and any one of the groups contains at least one S-SSB. When a synchronization period includes at least two S-SSBs, the time-domain location of at least one S-SSB is preconfigured, or determined from information carried by the PSBCH. Here, configuration information of the time-domain location of the at least one S-SSB can include: a time interval (Ti) between two adjacent S-SSBs in a same group. The time interval refers to the number of slots in an interval between two S-SSBs or an absolute length of the interval between two S-SSBs, and the time intervals among S-SSBs in the same group can be the same or different. Optionally, the slot includes at least one of following: a physical slot; an air-interface slot; an uplink slot; a sidelink slot.

Figure 2:
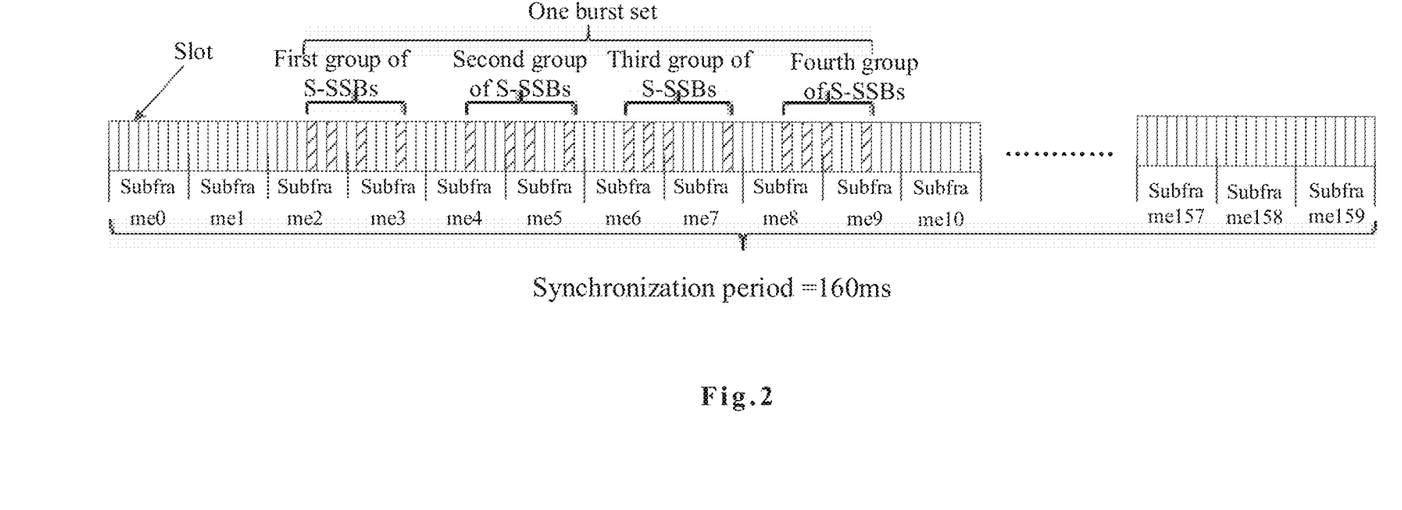
FIG. 2 is a schematic diagram of a first S-SSB transmission time-domain location in some embodiments of the present disclosure.

As shown in FIG. 2, FIG. 2 is a schematic diagram of a time-domain location of transmission of a S-SSB set under a subcarrier spacing of 120 KHz. Because of the 120 KHz, a subframe includes 8 slots, each small vertical grid represents a slot. Small blank vertical grids represent slots that do not contain any S-SSB, small vertical grids with slash lines represent slots including a S-SSB. A S-SSB set includes 16 S-SSBs, divided into 4 groups, each group includes 4 S-SSBs. The pre-configuration method is to configure the time interval between two adjacent S-SSBs in the same group to be Ti For the first group of S-SSBs, since there are four S-SSBs, three time intervals T1, T2, and T3 need to be configured. Different methods for calculating the time interval result in different values of the time interval. It can be seen from FIG. 2, if the time interval is calculated from the end of the first S-SSB to the start of the second S-SSB, then T1 is 1 slot; if the time interval is calculated from the start of the first S-SSB to the start of the second S-SSB, then T1 is 2 slots. Similarly, T2 is 2 slots or 3 slots, T3 is 3 slots or 4 slots. For the second group of S-SSBs, since there are four S-SSBs, three time intervals T4, T5, and T6 need to be configured. T4 is 3 or 4 slots, T5 is 1 slot or 2 slots; T6 is 3 slots or 4 slots. Configurations of time intervals of the third group of S-SSBs and the fourth group of S-SSB are similar, and details are not repeated here. The configurations of this embodiment is intuitive and calculation is easy, and each time interval of S-SSBs is independently configured and flexible.

In an optional embodiment of the present disclosure, when the Q is greater than or equal to 2, a time interval between two adjacent groups is pre-configured, and a unit of the time interval between the two adjacent groups is slot or millisecond, when the unit of time interval is the slot, the value of time interval is greater than or equal to 1 slot, and when the unit of time interval is millisecond, the value of the time interval is greater than or equal to 0 ms. Optionally, time intervals between two adjacent groups are the same. Optionally, the slot includes at least one of following: a physical slot; an air-interface slot; an uplink slot; a sidelink slot.

A specific implementation method of this embodiment is as follows: transmitting P (P greater than or equal to 1) S-SSBs in a synchronization period, and P S-SSBs are divided into Q groups (Q greater than or equal to 1), and any of the groups contains at least one S-SSB. When a synchronization period includes at least two S-SSBs, the time-domain location of at least one S-SSB is preconfigured, or determined from the information carried by the PSBCH. The time interval Mi between two groups is preconfigured;

As shown in FIG. 2, FIG. 2 is a schematic diagram of a time-domain location of transmission of a S-SSB set under a subcarrier spacing of 120 KHz. Because of the 120 KHz, a subframe includes 8 slots, of course, a subframe can also include other number of slots, each small vertical grid represents a slot. Small blank vertical grids represent slots that do not contain a S-SSB, small vertical grids with slash lines represent slots including a S-SSB. Here provided is an example that one S-SSB set includes 16 S-SSBs, the S-SSB set is divided into 4 groups, each group includes 4 S-SSBs. The time interval Mi between two groups is preconfigured.

For a time interval M1 between the first group of S-SSBs and the second group of S-SSBs, if the time interval is calculated from the end of the last S-SSB of the first group to the start of the first S-SSB of the second group, then M1 is 6 slots; if the time interval is calculated from the start of the first S-SSB of the first group to the start of the first S-SSB of the second group, then M1 is 16 slots. For a time interval M2 between the second group of S-SSBs and the third group of S-SSBs. M2 is 5 slots or 16 slots depending on two different calculating methods. Configuration of the time interval M3 between the third group of S-SSBs and the fourth group of S-SSBs is similar, and details are not repeated here.

Optionally, time intervals between two adjacent groups may be the same, that is, M1, M2 and M3 are equal. In this way, configurations would be simplified and configuration complexity would be reduced. When values of time intervals between two adjacent groups are the same, only one value M0 needs to be configured, that is, M1=M2=M3=M0.

Advantage of this configuration method is that the configuration is intuitive and calculation is easy, and the time interval between every two S-SSB groups can be configured independently or can be configured to the same value, and the configuration is flexible and variable.

In an optional embodiment of the present disclosure, when the time-domain location of at least one SSB is preconfigured, pre-configuration information of the time-domain location includes at least one of the following parameters: a time interval between two adjacent SSBs in a same group, time intervals between all SSBs in a same group and the first SSB in the group: time intervals between all SSBs in a synchronization period and a first SSB in the synchronization period; wherein the time interval is Ti slots or Ti milliseconds, and Ti is greater than or equal to 0. Optionally, the slot includes at least one of following: a physical slot; an air-interface slot; an uplink slot; a sidelink slot.

Here, a specific implementation method of this embodiment of the time intervals between all SSBs in a same group and the first SSB in the group is as follows: transmitting P (P greater than or equal to 1) S-SSBs in a synchronization period, and P S-SSBs are divided into Q groups (Q greater than or equal to 1), and any of the groups contains at least one S-SSB. When a synchronization period includes at least two S-SSBs, the time-domain location of at least one S-SSB is preconfigured, or determined from the information carried by the PSBCH. The time-domain location of at least one S-SSB is preconfigured, the pre-configuration method is to configure the time intervals Ti between all S-SSBs in the same group and the first S-SSB in the group.

As shown in FIG. 2, FIG. 2 is a schematic diagram of a time-domain location of transmission of a S-SSB set under a subcarrier spacing of 120 KHz. Because of the 120 KHz, a subframe includes 8 slots, of course, a subframe can also include other number of slots, each small vertical grid represents a slot. Small blank vertical grids represent slots that do not contain a S-SSB, small vertical grids with slash lines represent slots including a S-SSB. Here provided is an example that one S-SSB set includes 16 S-SSBs, the S-SSB set is divided into 4 groups, each group includes 4 S-SSBs. Here, the pre-configuration method is to configure the time interval Ti between all S-SSBs in the same group and the first S-SSB in the group.

For the first group of S-SSBs, since there are four S-SSBs, three time intervals T1, T2, and T3 need to be configured. Different methods for calculating the time interval result in different values of the time interval. It can be seen from FIG. 2 that, if the time interval is calculated from the end of the first S-SSB to the start of the second S-SSB, then T1 is 1 slot; if the time interval is calculated from the start of the first S-SSB to the start of the second S-SSB, then T1 is 2 slots. Similarly, T2 is 4 or 5 slots, T3 is 8 or 9 slots. For the second group of S-SSBs, since there are four S-SSBs, three time intervals T4. T5, and T6 need to be configured. Similarly, T4 is 3 or 4 slots, T5 is 5 or 6 slots; T6 is 9 or 10 slots. Configurations of the time intervals of the third group of S-SSBs and the fourth group of S-SSBs are similar, and details are not repeated here. The configurations of this embodiment is intuitive and calculation is easy, and each time interval of S-SSBs is independently configured and flexible.

Here, a specific implementation of the embodiment of time intervals between all SSBs and the first SSB in the synchronization period is as follows: transmitting P (P greater than or equal to 1) S-SSBs in a synchronization period, and P S-SSBs are divided into Q groups (Q greater than or equal to 1), and any of the groups contains at least one S-SSB. When a synchronization period includes at least two S-SSBs, the time-domain location of at least one S-SSB is preconfigured, or determined from the information carried by the PSBCH. The time-domain location of at least one S-SSB is preconfigured, the pre-configuration method is to configure the time intervals Ti between all S-SSBs and the first S-SSB in a synchronization period.

As shown in FIG. 2, FIG. 2 is a schematic diagram of a time-domain location of transmission of a S-SSB set under a subcarrier spacing of 120 KHz. Because of the 120 KHz, a subframe includes 8 slots, of course, a subframe can also include other number of slots, each small vertical grid represents a slot. Small blank vertical grids represent slots that do not contain a S-SSB, small vertical grids with slash lines represent slots including a S-SSB. Here provided is an example that one S-SSB set includes 16 S-SSBs, the S-SSB set is divided into 4 groups, each group includes 4 S-SSBs. Here, the pre-configuration method is to configure the time intervals Ti between all S-SSBs and the first S-SSB in a synchronization period.

For the first group of S-SSBs, since there are four S-SSBs, three time intervals T1, T2, and T3 need to be configured. Different methods for calculating the time interval result in different values of the time interval. It can be seen from FIG. 2 that if the time interval is calculated from the end of the first S-SSB to the start of the second S-SSB, then T1 is 1 slot; if the time interval is calculated from the start of the first S-SSB to the start of the second S-SSB, then T1 is 2 slots. Similarly, T2 is 4 or 5 slots, T3 is 8 or 9 slots. For the second group of S-SSBs, since there are four S-SSBs, three time intervals T4, T5, and T6 need to be configured. Similarly, T4 is 15 or 16 slots, T5 is 12 or 13 slots; T6 is 16 or 17 slots. Configuration of time intervals of the third group of S-SSBs and the fourth group of S-SSBs are similar, and details are not repeated here. The configurations of this embodiment is intuitive and calculation is easy, and each time interval of S-SSBs is independently configured and flexible.

Here, a specific implementation method of this embodiment that time intervals of two adjacent SSBs in the same group are the same is as follows: transmitting P (P greater than or equal to 1) S-SSBs in a synchronization period, and P S-SSBs are divided into Q groups (Q greater than or equal to 1), and any of the groups contains at least one S-SSB. When a synchronization period includes at least two S-SSBs, the time-domain location of at least one S-SSB is preconfigured, or determined from the information carried by the PSBCH. The time-domain location of at least one S-SSB is preconfigured, the pre-configuration method is to configure the time interval between two adjacent S-SSBs in the same group and the time intervals between multiple S-SSBs in the same group to be the same T0 slots or T0 milliseconds.

Figure 3:
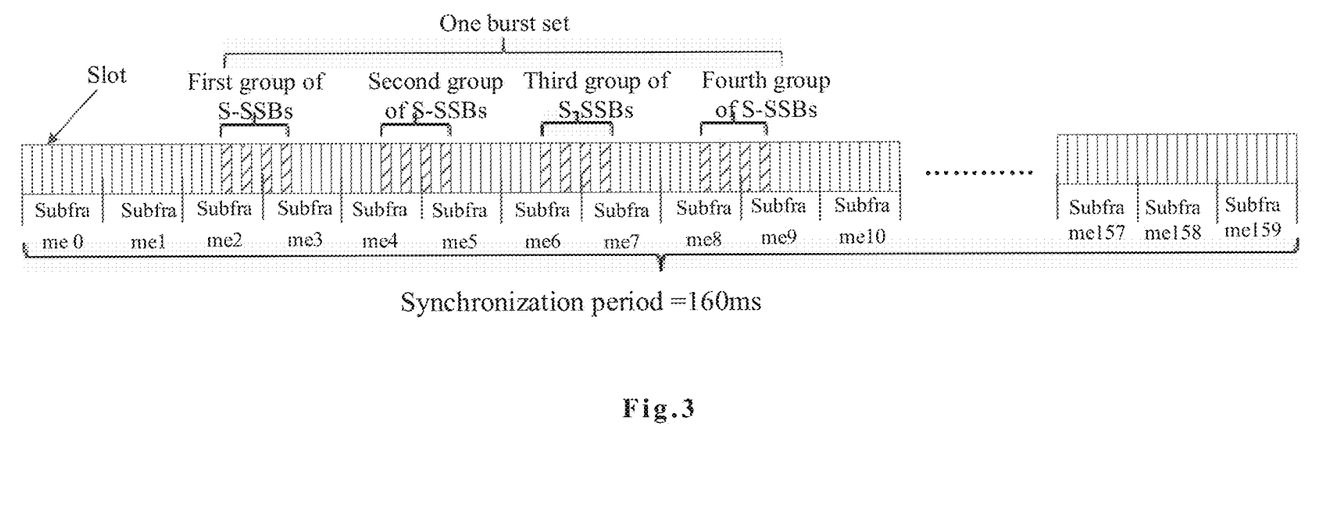
FIG. 3 is a schematic diagram of a second S-SSB transmission time-domain location in some embodiments of the present disclosure.

As shown in FIG. 3, FIG. 3 is a schematic diagram of a time-domain location of transmission of a S-SSB set under a subcarrier spacing of 120 KHz. Because of the 120 KHz, a subframe includes 8 slots, of course, a subframe can also include other number of slots, each small vertical grid represents a slot. Small blank vertical grids represent slots that do not contain a S-SSB, small vertical grids with slash lines represent slots including a S-SSB. Here provided is an example that one S-SSB set includes 16 S-SSBs, the S-SSB set is divided into 4 groups, each group includes 4 S-SSBs. Here, the pre-configuration method is to configure the time intervals T0 between two adjacent S-SSBs in the same group.

For the first group of S-SSBs, since there are four S-SSBs and the time intervals between S-SSBs of the group are the same, only one time interval T0 needs to be configured. Different methods for calculating the time interval result in different values of the time interval. It can be seen from FIG. 3 that, if the time interval is calculated from the end of the first S-SSB to the start of the second S-SSB, then T0 is 1 slot, if the time interval is calculated from the start of the first S-SSB to the start of the second S-SSB, then T0 is 2 slots. For the second group of S-SSBs, T0 is 1 or 2 slots similarly. Configurations of time intervals of the third group of S-SSBs and the fourth group of S-SSBs are similar, and details are not repeated here. Advantage of this embodiment is intuitive and calculation is easy, and the time intervals of adjacent S-SSBs in the same group is the same, only a few parameters need to be configured, the configuration is relatively simple.

In an optional embodiment of the present disclosure, the number of SSBs in each group is preconfigured. Optionally, the number of SSBs in each group is the same, a specific implementation method is as followed: transmitting P (P greater than or equal to 1) S-SSBs in a synchronization period, and P S-SSBs are divided into Q groups (Q greater than or equal to 1), and any of the groups contains at least one S-SSB. When a synchronization period includes at least two S-SSBs, the time-domain location of at least one S-SSB is preconfigured, or determined from the information carried by the PSBCH. the number Ni of SSBs contained within each group is preconfigured.

As shown in FIG. 2, FIG. 2 is a schematic diagram of a time-domain location of transmission of a S-SSB set under a subcarrier spacing of 120 KHz. Because of the 120 KHz, a subframe includes 8 slots, of course, a subframe can also include other number of slots, each small vertical grid represents a slot. Small blank vertical grids represent slots that do not contain a S-SSB, small vertical grids with slash lines represent slots including a S-SSB. Here provided is an example that one S-SSB set includes 16 S-SSBs, the S-SSB set is divided into 4 groups, each group includes 4 S-SSBs. The number Ni of SSBs in each group is also preconfigured.

For the number N1 of S-SSBs contained within the first group of S-SSBs, it can be seen from FIG. 2 that N1 is equal to 4.

For the number N2 of S-SSBs contained within the second group of S-SSBs, it can be seen from FIG. 2 that N2 is equal to 4.

For the number N3 of S-SSBs contained within the third group of S-SSBs, it can be seen from FIG. 2 that N3 is equal to 4.

For the number N4 of S-SSBs contained within the third group of S-SSBs, it can be seen from FIG. 2 that N4 is equal to 4.

It should be noted that the numbers of S-SSBs contained within 4 groups in FIG. 2 are the same, that is, N1, N2, N3 and N4 are the same. But in actual configuration, N1, N2, N3 and N4 can be configured as different values to improve flexibility. When the numbers of SSBs contained within the groups are the same, only one value N0 needs to be configured, that is, N1=N2=N3=N4=N0.

The configuration of this embodiment is intuitive and calculation is easy, and the number of S-SSBs contained within each S-SSB group may be independently configured or configured to the same value, the configuration is flexible.

In an optional embodiment of the present disclosure, according to at least one of a Subcarrier Spacing (SCS) used by the terminal, a frequency range and information carried by the PBCH, at least one of following parameters is determined: a time-domain location of a SSB; number P of SSBs sent in a synchronization period; a time interval between two groups; the number of SSBs contained within each group; the number Q of groups contained within a synchronization period.

In this embodiment, optionally, the parameters are determined through pre-configuration according to the subcarrier spacing SCS and/or the frequency range. A specific implementation method is as followed: transmitting P (P greater than or equal to 1) S-SSBs in a synchronization period, and P S-SSBs are divided into Q groups (Q greater than or equal to 1), and any of the groups contains at least one S-SSB. When a synchronization period includes at least two S-SSBs, the time-domain location of at least one S-SSB is preconfigured, or determined from the information carried by the PSBCH.

At least one parameter in the following parameters are configured according to a subcarrier spacing (SCS) and/or a frequency range (FR1/FR2): a time-domain location Ti of a SSB; the number P of SSBs sent in a synchronization period; the time interval Mi between two groups; the number Ni of SSBs contained within each group; the number Q of groups contained within a synchronization period.

For example: a terminal determines values of N0, T0 and P according to the current SCS and/or the FR. There are two options for the frequency range, namely FR1 and FR2. FR1 refers to a frequency range 1, which generally refers to a low frequency band below 6 GHz. FR2 refers to a frequency range 2, which generally refers to a mmWave high frequency band. As shown in following Table 1:

TABLE 1

| Serial number | Frequency range used by terminal | Subcarrier spacing used by terminal | N0 (number of slots) | T0 (number of slots) | P |
|---|---|---|---|---|---|
| 1 | FR1 | 15 KHz | 1 | \ | 1 |
| 2 | FR1 | 30 KHz | 2 | 1 | 2 |
| 3 | FR1 | 60 KHz | 4 | 1 | 4 |
| 4 | FR2 | 60 KHz | 4 | 2 | 32 |
| 5 | FR2 | 120 KHz | 8 | 2 | 64 |

Advantages of the configuration method in this embodiment are that the configuration method is simple and direct, and does not occupy an air-interface signaling or a Sidelink signaling, and has a low overhead.

In an optional embodiment of the present disclosure, a first part of the parameters are determined though pre-configuration according to the subcarrier spacing SCS and/or a frequency range, and a second part of the parameters are determined according to information carried by PBCH.

In an optional embodiment of the present disclosure, a first part of the parameters are determined though pre-configuration according to the subcarrier spacing SCS and/or the frequency range, a second part of the parameters are determined according to information carried by PBCH, and a third part of the parameters are determined though pre-configuration according to the subcarrier spacing SCS and/or the frequency range and information carried by PBCH.

A specific implementation method of this embodiment is as follows: transmitting P (P greater than or equal to 1) S-SSBs in a synchronization period, and P S-SSBs are divided into Q groups (Q greater than or equal to 1), and any of the groups contains at least one S-SSB. When a synchronization period includes at least two S-SSBs, the time-domain location of at least one S-SSB is preconfigured, or determined from the information carried by the PSBCH.

At least one parameter in the following parameters are configured according to the subcarrier spacing (SCS) and/or the frequency range (FR1/FR2) and the information carried by the PSBCH: the time-domain location Ti of a SSB; the number P of SSBs sent in a synchronization period; the time interval Mi between two groups; the number Ni of SSBs contained within each group; the number Q of groups contained within a synchronization period.

For example: a terminal determines values of N0, T0 according to the current SCS and/or the FR. There are two options for the frequency range, namely FR1 and FR2. FR1 refers to a frequency range 1, which generally refers to a low frequency band below 6 GHz. FR2 refers to a frequency range 2, which generally refers to a mmWave high frequency band. Then, the terminal determines the value of P according to 2-bit information carried by PSBCH DMRS. Preconfigured N0 and T0 are shown in following table 2:

TABLE 2

| serial number | frequency range used by the terminal | subcarrier spacing used by the terminal | N0 (the number of slots) | T0 (the number of slots) |
|---|---|---|---|---|
| 1 | FR1 | 15 KHz | 1 | \ |
| 2 | FR1 | 30 KHz | 2 | 1 |
| 3 | FR1 | 60 KHz | 4 | 1 |
| 4 | FR2 | 60 KHz | 4 | 2 |
| 5 | FR2 | 120 KHz | 8 | 2 |

P indicated by 2 bits in PSBCH is shown in the following table set:

| FR used by the terminal | SCS used by the terminal | a mapping table between a value of 2 bits in PSBCH and a value of P | |
|---|---|---|---|
| | | the value of 2 bits in PSBCH | P |
| FR1 | 15 KHz | 00 | 1 |
| | | 01 | 1 |
| | | 10 | 1 |
| | | 11 | 1 |
| FR1 | 30 KHz | 00 | 1 |
| | | 01 | 1 |
| | | 10 | 2 |
| | | 11 | 2 |
| FR1 | 60 KHz | 00 | 1 |
| | | 01 | 1 |
| | | 10 | 2 |
| | | 11 | 4 |
| FR2 | 60 KHz | 00 | 4 |
| | | 01 | 8 |
| | | 10 | 16 |
| | | 11 | 32 |
| FR2 | 120 KHz | 00 | 8 |
| | | 01 | 16 |
| | | 10 | 32 |
| | | 11 | 64 |

Advantage of the configuration method in this embodiment is that P is notified through the PSBCH, and the value of P is flexible and configurable, and notifying N0 and T0 is simple and direct, and does not occupy an air-interface signaling or a sidelink signaling.

In the above embodiments of the present disclosure, the information carried by the PBCH includes information carried by a Demodulation Reference Signal (DMRS) corresponding to the PBCH or information carried by a PBCH payload.

In the embodiments of the present disclosure, the configuration information of the time-domain location of the synchronization signal block SSB set may be notified to the terminal through pre-configuration and/or through being carried by a Physical Sidelink Broadcast Channel (PSBCH), so that the terminal receives the synchronization signal block SSB set at the time-domain location and acquires synchronization information in a soft-combining manner. The terminal can detect the synchronization signal block set at the preset time-domain location by using the method, which improves the success rate of detecting the synchronization signal block, meanwhile, the synchronization signal block set discontinuously sent avoids introducing a large service delay, thereby improving the synchronization success rate of the sidelink and reducing a transmission delay.

Figure 4:
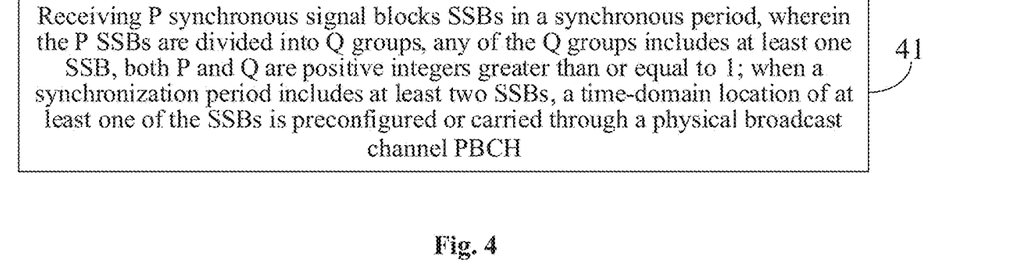
FIG. 4 is a schematic flowchart of a signal reception method in some embodiments of the present disclosure.

As shown in FIG. 4, embodiments of the present disclosure also provide a signal reception method, applied to a terminal. The method includes a step 41.

Step 41: receiving P synchronous signal blocks SSBs in a synchronous period, wherein the P SSBs are divided into Q groups, any of the groups includes at least one SSB. P and Q are both positive integers greater than or equal to 1; when a synchronization period includes at least two SSBs, the time-domain location of at least one SSB is preconfigured or carried through the physical broadcast channel PBCH.

Optionally, the P is preconfigured. The Q is preconfigured.

Optionally, when the Q is greater than or equal to 2, a time interval between two adjacent groups is pre-configured, and the unit of the time interval between the two adjacent groups is slot or millisecond; when the unit of time interval is slot, the value of time interval is greater than or equal to 1 slot; or when the unit of time interval is millisecond, the value of time interval is greater than or equal to 0 ms.

Optionally, time intervals between two adjacent groups are the same.

Optionally, when the time-domain location of at least one SSB is preconfigured, pre-configuration information of the time-domain location includes at least one of the following parameters: a time interval between two adjacent SSBs in a same group; time intervals between all SSBs in a same group and a first SSB in the group; time intervals between all SSBs and a first SSB in the synchronization period.

The time interval is Ti slots or Ti milliseconds, and Ti is greater than or equal to 0.

Optionally, time intervals between two adjacent SSBs in a same group are same.

Optionally, the slot includes at least one of following: a physical slot; an air-interface slot; an uplink slot; a sidelink slot.

Optionally, the number of SSBs contained within each group is preconfigured.

Optionally, the numbers of SSBs contained within different groups are the same.

Optionally, at least one of following parameters is determined according to at least one of a subcarrier spacing SCS used by the terminal, a frequency range and information carried by the PBCH: the time-domain location of a SSB; the number P of SSBs sent in a synchronization period; time interval between two groups; the number of SSBs contained within each group; the numbers Q of groups contained within a synchronization period.

Optionally, the parameters are determined though pre-configuration according to the subcarrier spacing SCS and/or the frequency range.

Optionally, a first part of parameters are determined though pre-configuration according to the subcarrier spacing SCS and/or the frequency range, a second part of parameters are determined according to the information carried by the PBCH.

Optionally, a first part of parameters are determined though pre-configuration according to the subcarrier spacing SCS and/or the frequency range, a second part of parameters are determined according to information carried by PBCH, and a third part of parameters are determined though pre-configuration according to the subcarrier spacing SCS and/or the frequency range and information carried by PBCH.

Optionally, the information carried by the PBCH includes information carried by the demodulation reference signal DMRS corresponding to the PBCH or information carried by the PBCH payload.

Optionally, the SSB is a sidelink synchronous signal block S-SSB, the PBCH is a physical sidelink broadcast channel PSBCH, the synchronous period is a sidelink synchronous period.

It should be noted that all the implementations of the above embodiments are applicable to this embodiment, and the same technical effect can also be achieved.

The embodiment of the present disclosure receives P synchronous signal blocks SSBs in a synchronous period, the P SSBs are divided into Q groups, any of the groups includes at least one SSB, P and Q are both positive integers greater than or equal to 1; when a synchronization period includes at least two SSBs, the time-domain location of at least one SSB is preconfigured or carried through the physical broadcast channel PBCH. In this way, the terminal can detect the synchronization signal block set at the preset time-domain location, which improves the success rate of detecting the synchronization signal block, meanwhile, the synchronization signal block set discontinuously sent avoids introducing a large service delay, thereby improving the synchronization success rate of the sidelink and reducing the transmission delay.

Figure 5:
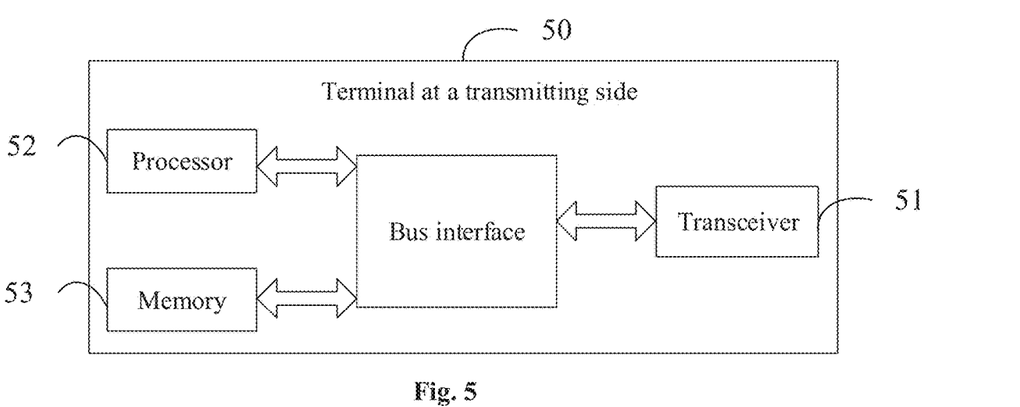
FIG. 5 is a structural schematic diagram of a terminal at a transmitting side in some embodiments of the present disclosure.

As shown in FIG. 5, embodiments of the present disclosure provide a terminal 50, including: a transceiver 51, a processor 52, a memory 53 storing a computer program executable by the processor 52; when the computer program is executed by the processor 52, the processor 52 implements following: transmitting P synchronous signal blocks SSBs in a synchronous period, wherein the P SSBs are divided into Q groups, any of the groups includes at least one SSB, P and Q are both positive integers greater than or equal to 1; when a synchronization period includes at least two SSBs, the time-domain location of at least one SSB is preconfigured or carried through the physical broadcast channel PBCH.

Optionally, the P is preconfigured. The Q is preconfigured.

Optionally, when the Q is greater than or equal to 2, a time interval between two adjacent groups is pre-configured, and the unit of the time interval between the two adjacent groups is slot or millisecond; when the unit of time interval is slot, the value of time interval is greater than or equal to 1 slot; or when the unit of time interval is millisecond, the value of time interval is greater than or equal to 0 ms.

Optionally, time intervals between two adjacent groups are the same:

Optionally, when the time-domain location of at least one SSB is preconfigured, pre-configuration information of the time-domain location includes at least one of the following parameters: time intervals between two adjacent SSBs in a same group; time intervals between all SSBs in a same group and a first SSB in the group; time intervals between all SSBs and a first SSB in the synchronization period; wherein the time interval is Ti slots or Ti milliseconds, and Ti is greater than or equal to 0.

Optionally, time intervals between two adjacent SSBs in a same group are the same.

Optionally, the slot includes at least one of following: a physical slot; an air-interface slot; an uplink slot; a sidelink slot.

Optionally, the number of SSBs contained within each group is preconfigured.

Optionally, the numbers of SSBs contained within different groups are the same.

Optionally, at least one of following parameters is determined according to at least one of the subcarrier spacing SCS used by the terminal, the frequency range and information carried by the PBCH: the time-domain location of a SSB; the number P of SSBs sent in a synchronization period; the time interval between two groups; the number of SSBs contained within each group; the number Q of groups contained within a synchronization period.

Optionally, the parameters are determined though pre-configuration according to the subcarrier spacing SCS and/or the frequency range.

Optionally, a first part of parameters are determined though pre-configuration according to the subcarrier spacing SCS and/or the frequency range, a second part of parameters are determined according to information carried by the PBCH.

Optionally, a first part of parameters are determined though pre-configuration according to the subcarrier spacing SCS and/or the frequency range, a second part of parameters are determined according to information carried by the PBCH, and a third part of parameters are determined though pre-configuration according to the subcarrier spacing SCS and/or the frequency range and information carried by the PBCH.

Optionally, the information carried by the PBCH includes information carried by the demodulation reference signal DMRS corresponding to the PBCH or information carried by the PBCH payload.

Optionally, the SSB is a sidelink synchronous signal block S-SSB, the PBCH is a physical sidelink broadcast channel PSBCH, the synchronous period is a sidelink synchronous period.

It should be noted that the terminal in this embodiment is the terminal corresponding to the method shown in the above FIG. 1, and the implementations in the above embodiments are all applicable to the embodiments of the terminal, and the same technical effect can also be achieved. In the terminal, the transceiver 51 and the memory 53, as well as the transceiver 51 and the processor 52 can be communicatively connected through a bus interface, the function of the processor 52 can also be realized by the transceiver 51, and the function of the transceiver 51 can also be realized by the processor 52. It should be noted here that the above-mentioned terminal provided by the embodiments of the present disclosure can implement all the method steps implemented by the above-mentioned method embodiment, and can achieve the same technical effect, and the same part in this embodiment as that in the method embodiment and beneficial effects thereof are not repeated here.

Figure 6:
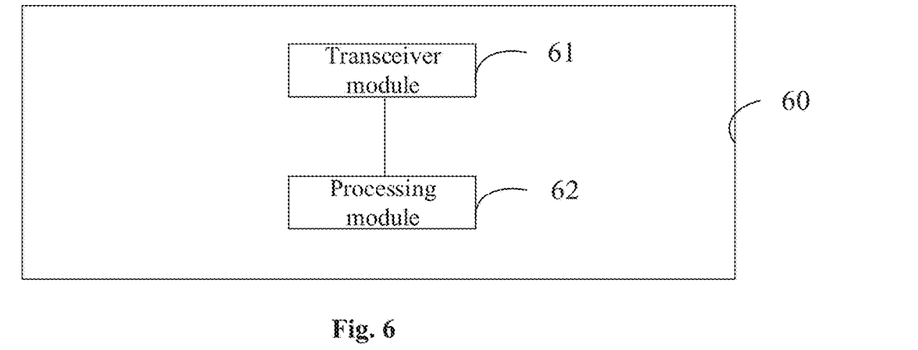
FIG. 6 is a block diagram of a signal transmission device in a terminal at a transmitting side in some embodiments of the present disclosure.

As shown in FIG. 6, the embodiments of the present disclosure also provide a signal transmission device 60. The signal transmission device 60 includes: a transceiver module 61, configured to transmit P synchronous signal blocks SSBs in a synchronous period, wherein the P SSBs are divided into Q groups, any of the groups includes at least one SSB, P and Q are both positive integers greater than or equal to 1; when a synchronization period includes at least two SSBs, the time-domain location of at least one SSB is preconfigured or carried through the physical broadcast channel PBCH.

Optionally, the P is preconfigured. The Q is preconfigured.

Optionally, when the Q is greater than or equal to 2, the time interval between two adjacent groups is pre-configured, and the unit of the time interval between the two adjacent groups is slot or millisecond; when the unit of time interval is slot, the value of the time interval is greater than or equal to 1 slot; or when the unit of time interval is millisecond, the value of the time interval is greater than or equal to 0 ms.

Optionally, time intervals between two adjacent groups are the same.

Optionally, when the time-domain location of at least one SSB is preconfigured, pre-configuration information of the time-domain location includes at least one of the following parameters: time intervals between two adjacent SSBs in a same group; time intervals between all SSBs in a same group and a first SSB in the group; time intervals between all SSBs and a first SSB in the synchronization period; wherein the time interval is Ti slots or Ti milliseconds, and Ti is greater than or equal to 0.

Optionally, time intervals between two adjacent SSBs in a same group are the same.

Optionally, the slot includes at least one of following: a physical slot; an air-interface slot; an uplink slot; a sidelink slot.

Optionally, the number of SSBs contained within each group is preconfigured.

Optionally, the numbers of SSBs contained within different groups are the same.

Optionally, at least one of the following parameters is determined according to at least one of the subcarrier spacing SCS used by the terminal, the frequency range and the information carried by the PBCH; the time-domain location of the SSB; the number P of SSBs sent in a synchronization period; the time interval between two groups; the number of SSBs contained within each group; the number Q of groups contained within a synchronization period.

Optionally, the parameters are determined though pre-configuration according to the subcarrier spacing SCS and/or the frequency range.

Optionally, a first part of parameters are determined though pre-configuration according to the subcarrier spacing SCS and/or the frequency range, a second part of parameters are determined according to information carried by the PBCH.

Optionally, a first part of parameters are determined though pre-configuration according to the subcarrier spacing SCS and/or the frequency range, a second part of parameters are determined according to information carried by PBCH, and a third part of parameters are determined though pre-configuration according to the subcarrier spacing SCS and/or the frequency range and information carried by the PBCH.

Optionally, the information carried by the PBCH includes information carried by the demodulation reference signal DMRS corresponding to the PBCH or information carried by the PBCH payload.

Optionally, the SSB is a sidelink synchronous signal block S-SSB, the PBCH is a physical sidelink broadcast channel PSBCH, the synchronous period is a sidelink synchronous period.

It should be noted that the device in this embodiment is the device corresponding to the method shown in the foregoing FIG. 1, and all the implementations in the above embodiments are applicable to the embodiments of the terminal, and the same technical effect can also be achieved. The device may further include a processing module 62, and the processing module 62 is configured to process the information sent by the transceiver module 61, and the like. It should be noted here that the above-mentioned device provided by the embodiment of the present disclosure can implement all the method steps implemented by the above-mentioned method embodiment, and the same technical effect can be achieved, and the same part in this embodiment as that in the method embodiment and the beneficial effect are not repeated here.

Figure 7:
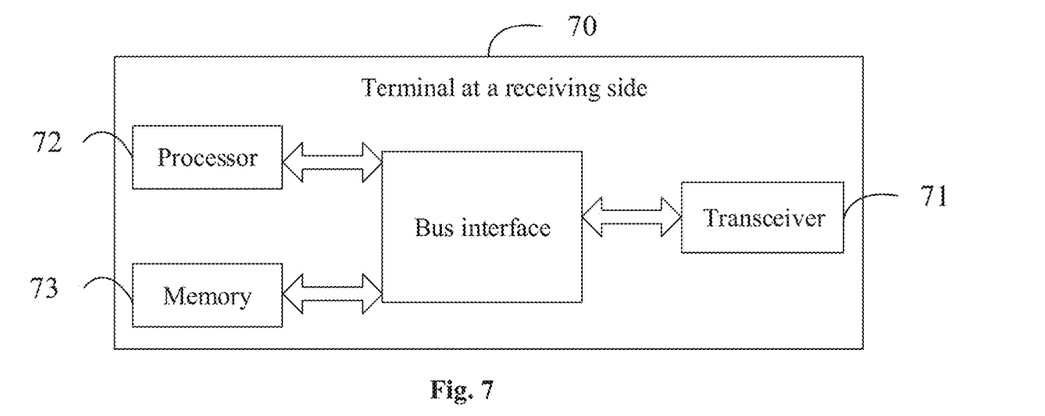
FIG. 7 is a structural schematic diagram of a terminal at a receiving side in some embodiments of the present disclosure.

As shown in FIG. 7, the embodiments of the present disclosure provide a terminal 70, including: a transceiver 71, a processor 72, a memory 73 storing a computer program executable by the processor 72; when the computer program is executed by the processor 72, the processor 52 implements following: transmitting P synchronous signal blocks SSBs in a synchronous period, the P SSBs are divided into Q groups, any of the groups includes at least one SSB, P and Q are both positive integers greater than or equal to 1; when a synchronization period includes at least two SSBs, the time-domain location of at least one SSB is preconfigured or carried through the physical broadcast channel PBCH.

Optionally, the P is preconfigured. The Q is preconfigured.

Optionally, when the Q is greater than or equal to 2, the time interval between two adjacent groups is pre-configured, and the unit of the time interval between the two adjacent groups is a slot or a millisecond; when the unit of time interval is a slot, the value of the time interval is greater than or equal to 1 slot; or when the unit of time interval is a millisecond, the value of the time interval is greater than or equal to 0 ms.

Optionally, time intervals between two adjacent groups are the same.

Optionally, when the time-domain location of at least one SSB is preconfigured, pre-configuration information of the time-domain location includes at least one of the following parameters: time intervals between two adjacent SSBs in a same group; time intervals between all SSBs in a same group and a first SSB in the group; time intervals between all SSBs and a first SSB in the synchronization period; wherein the time interval is Ti slots or Ti milliseconds, and Ti is greater than or equal to 0.

Optionally, time intervals between two adjacent SSBs in a same group are the same.

Optionally, the slot includes at least one of following: a physical slot; an air-interface slot; an uplink slot; a sidelink slot.

Optionally, the number of SSBs contained within each group is preconfigured.

Optionally, the numbers of SSBs contained within different groups are the same.

Optionally, at least one of following parameters is determined according to at least one of the subcarrier spacing SCS used by the terminal, the frequency range and information carried by the PBCH: the time-domain location of a SSB; the number P of SSBs sent in a synchronization period; the time interval between two groups; the number of SSBs contained within each group; the number Q of groups contained within a synchronization period.

Optionally, the parameters are determined though pre-configuration according to the subcarrier spacing SCS and/or the frequency range.

Optionally, a first part of parameters are determined though pre-configuration according to the subcarrier spacing SCS and/or the frequency range, a second part of parameters are determined according to information carried by the PBCH.

Optionally, a first part of parameters are determined though pre-configuration according to the subcarrier spacing SCS and/or the frequency range, a second part of parameters are determined according to information carried by the PBCH, and a third part of parameters are determined though pre-configuration according to the subcarrier spacing SCS and/or the frequency range and information carried by the PBCH.

Optionally, the information carried by the PBCH includes information carried by the demodulation reference signal DMRS corresponding to the PBCH or information carried by the PBCH payload.

Optionally, the SSB is a sidelink synchronous signal block S-SSB, the PBCH is a physical sidelink broadcast channel PSBCH, the synchronous period is a sidelink synchronous period.

It should be noted that the terminal in this embodiment is the terminal corresponding to the method shown in the foregoing FIG. 4, and all the implementations in the above embodiments are applicable to the embodiments of the terminal, and the same technical effect can also be achieved. In the terminal, the transceiver 71 and the memory 73, as well as the transceiver 71 and the processor 72 can be communicatively connected through a bus interface, the function of the processor 72 can also be realized by the transceiver 71, and the function of the transceiver 71 can also be realized by the processor 72. It should be noted here that the above-mentioned terminal provided by the embodiment of the present disclosure can implement all the method steps implemented by the above-mentioned method embodiment, and can achieve the same technical effect, and the same part in this embodiment as that of the method embodiment and the beneficial effects are not repeated here.

Figure 8:
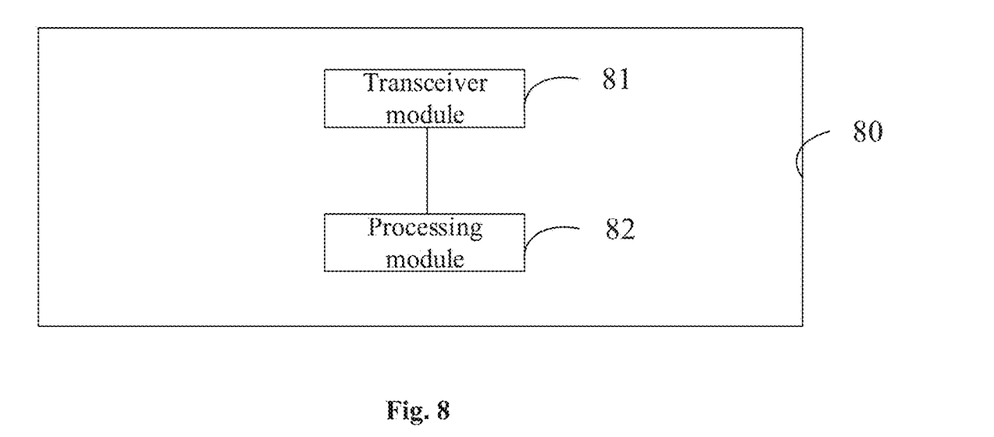
FIG. 8 is a block diagram of a signal transmission device in a terminal at a receiving side in some embodiments of the present disclosure.

Embodiments of this present disclosure also provide a signal reception device 80. The signal reception device includes: a transceiver module 81, configured to receive P synchronous signal blocks SSBs in a synchronous period, wherein the P SSBs are divided into Q groups, any of the groups includes at least one SSB, P and Q are both positive integers greater than or equal to 1; when a synchronization period includes at least two SSBs, the time-domain location of at least one SSB is preconfigured or carried through the physical broadcast channel PBCH.

Optionally, the P is preconfigured. The Q is preconfigured.

Optionally, when the Q is greater than or equal to 2, the time interval between two adjacent groups is pre-configured, and the unit of the time interval between the two adjacent groups is a slot or a millisecond; when the unit of time interval is a slot, the value of the time interval is greater than or equal to 1 slot; or when the unit of the time interval is millisecond, the value of the time interval is greater than or equal to 0 ms.

Optionally, time intervals between two adjacent groups are the same.

Optionally, when the time-domain location of at least one SSB is preconfigured, pre-configuration information of the time-domain location includes at least one of the following parameters: time intervals between two adjacent SSBs in a same group; time intervals between all SSBs in a same group and a first SSB in the group; time intervals between all SSBs and a first SSB in the synchronization period; wherein the time interval is Ti slots or Ti milliseconds, and Ti is greater than or equal to 0.

Optionally, time intervals between two adjacent SSBs in a same group are the same.

Optionally, the slot includes at least one of following: a physical slot; an air-interface slot; an uplink slot; a sidelink slot.

Optionally, the number of SSBs contained within each group is preconfigured.

Optionally, the numbers of SSBs contained within different groups are the same.

Optionally, at least one of following parameters is determined according to at least one of the subcarrier spacing SCS used by the terminal, the frequency range and information carried by the PBCH: the time-domain location of a SSB; the number P of SSBs sent in a synchronization period; the time interval between two groups; the number of SSBs contained within each group; the number Q of groups contained within a synchronization period.

Optionally, the parameters are determined though pre-configuration according to the subcarrier spacing SCS and/or the frequency range.

Optionally, a first part of parameters are determined though pre-configuration according to the subcarrier spacing SCS and/or the frequency range, a second part of parameters are determined according to information carried by the PBCH.

Optionally, a first part of parameters are determined though pre-configuration according to the subcarrier spacing SCS and/or the frequency range, a second part of parameters are determined according to information carried by the PBCH, and a third part of parameters are determined though pre-configuration according to the subcarrier spacing SCS and/or the frequency range and information carried by the PBCH.

Optionally, the information carried by the PBCH includes information carried by the demodulation reference signal DMRS corresponding to the PBCH or information carried by the PBCH payload.

Optionally, the SSB is a sidelink synchronous signal block S-SSB, the PBCH is a physical sidelink broadcast channel PSBCH, the synchronous period is a sidelink synchronous period.

It should be noted that the device in this embodiment is the device corresponding to the method shown in the above FIG. 4, and all the implementations in the above embodiments are applicable to the embodiments of the terminal, and the same technical effect can also be achieved. The device may further include a processing module 82, and the processing module 82 is configured to process the information sent by the transceiver module 81, and the like. It should be noted here that the above-mentioned device provided by the embodiment of the present disclosure can implement all the method steps implemented by the above-mentioned method embodiment, and can achieve the same technical effect, and the same part in this embodiment as that in the method embodiment and the beneficial effect is not repeated here.

The embodiments of this present disclosure also provide a processor-readable storage medium, wherein the processor-readable storage medium includes an instruction stored on the processor-readable storage medium, and when the instruction is executed on a processor, the processor executes the above method shown in FIG. 1 or FIG. 4 and all the implementations in the above method embodiment are applicable to this embodiment, and the same technical effect can also be achieved.

Those skilled in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Those skilled in the art may implement the described functionality using different methods for each particular application, but such implementations should not be considered to go beyond the scope of the present disclosure.

Those skilled in the art can clearly understand that, for the convenience and brevity of description, the specific working process of the above-described systems, devices and units may refer to the corresponding processes in the foregoing method embodiments, which will not be repeated here.

In the embodiments provided in the present disclosure, it should be understood that the disclosed apparatus and method may be implemented in other manners. For example, the apparatus embodiments described above are only illustrative. For example, the division of the units is only a logical functional division. In actual implementation, there may be other division methods. For example, multiple units or components may be combined or can be integrated into another system, or some features can be ignored, or not implemented. On the other hand, the shown or discussed mutual coupling or direct coupling or communication connection may be indirect coupling or communication connection between devices or units through some interfaces, and may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solutions in this embodiment.

In addition, functional units in each embodiment of the present disclosure may be integrated into one processing unit, or each unit may exist physically alone, or two or more units may be integrated into one unit.

The functions, if implemented in the form of software functional units and sold or used as independent products, may be stored in a computer-readable storage medium. Based on this understanding, an essential part, a part that contributes to the related art, or a part, of the technical solutions of the present disclosure can be embodied in the form of software products. The computer software product is stored in a storage medium, including several instructions used to cause a computer device (which may be a personal computer, a server, or a network device, etc.) to execute all or part of the steps of the methods described in the various embodiments of the present disclosure. The aforementioned storage medium includes: a U disk, a removable hard disk, a ROM, a RAM, a magnetic disk, or an optical disk and other mediums that can store program codes.

Those of ordinary skill in the art can understand that all or part of the processes in the methods of the above embodiments can be implemented by controlling the relevant hardware through a computer program, and the program can be stored in a computer-readable storage medium. During execution, the processes of the embodiments of the above-mentioned methods may be included. The storage medium includes a magnetic disk, an optical disk, Read-Only Memory (ROM), Random Access Memory (RAM), etc.

It can be understood that the embodiments described in the embodiments of the present disclosure may be implemented by hardware, software, firmware, middleware, microcode, or a combination thereof. For hardware implementation, modules, units and sub-units can be implemented in one or more Application Specific Integrated Circuits (ASICs), a Digital Signal Processor (DSPs), a Digital Signal Processing Device (DSP Device, DSPD), a Programmable Logic Device (PLD), a Field-Programmable Gate Array (FPGA), a general-purpose processor, a controller, a microcontroller, a microprocessor, other electronic units for performing the functions of the present disclosure, or combinations thereof.

For software implementation, the techniques described in the embodiments of the present disclosure may be implemented through modules (e.g., procedures, functions, etc.) that perform the functions described in the embodiments of the present disclosure. Software codes may be stored in a memory and executed by a processor. The memory can be implemented in the processor or external to the processor.

In addition, it should be noted that in the device and the method of the present disclosure, it is obvious that the parts or steps can be decomposed and/or recombined. The decomposition and/or recombination shall be deemed to be equivalent to the present disclosure. Furthermore, the steps to implement the above series of processes can be executed in a natural chronological order, but not necessarily in a chronological order, and some steps can be executed in parallel or independently of each other. For those skilled in this field, it should be understood that all or any of the steps or components of method and device of the present disclosure can be implemented by means of hardware, firmware, software or a combination of them in any computing device (including processors, storage media, etc.) or a network of computing devices. This is what those skilled in this field can do with their basic programming skills after reading the contents of the present disclosure.

Therefore, the purpose of the present disclosure can also be achieved by running a program or a group of programs on any computing device. The computing device can be may be a known universal device. Therefore, the purpose of the present disclosure can also be achieved by providing a program product that contains program codes implementing the method or device only. That is, such program products also constitute the present disclosure, and a storage medium in which such program products are stored also constitutes the present disclosure. Obviously, the storage medium may be any known storage medium or any storage medium to be developed in the future. It should be noted that in the device and method of the present disclosure, it is obvious that the parts or the steps can be decomposed and/or recombined. The decomposition and/or recombination shall be deemed to be equivalent to the present disclosure. Furthermore, the steps to implement the above series of processes can be executed in a natural chronological order, but not necessarily in a chronological order, and some steps can be executed in parallel or independently of each other. Some steps can be implemented in parallel or independently of each other.

The above are optional implementations of the present disclosure. It should be noted that those skilled in the art can make various improvements and modifications to the present disclosure without departing from the principle of the present disclosure, and these improvements and modifications should also be considered within the scope of the present disclosure.

What is claimed is:

1. A signal transmission method performed by a terminal, comprising:
   transmitting P synchronous signal blocks SSBs in a synchronous period,
   wherein the P SSBs are divided into Q groups, any of the Q groups comprises at least one SSB, both P and Q are positive integers greater than or equal to 1;
   when a synchronization period comprises at least two SSBs, a time-domain location of at least one of the SSBs is preconfigured or carried through a physical broadcast channel PBCH,
   wherein when the time-domain location of the at least one of the SSBs is preconfigured, preconfigured information of the time-domain location comprises at least one of the following parameters:
   time intervals between two adjacent SSBs in a same group;
   time intervals between all SSBs in a same group and a first SSB in the group; or
   time intervals between all SSBs and a first SSB in a synchronization period;
   wherein the time interval is Ti slots or Ti milliseconds, Ti is greater than or equal to 0.

2. The signal transmission method according to claim 1, wherein time intervals between two adjacent groups are same.

3. The signal transmission method according to claim 1, wherein at least one of following parameters are preconfigured:
   a quantity of SSBs contained within each group;
   a value of P;
   a value of Q.

4. The signal transmission method according to claim 1, wherein at least one of following parameters is determined according to at least one of a subcarrier spacing SCS used by the terminal, a frequency range, and information carried by the PBCH:
   a time-domain location of a SSB;
   a quantity P of SSBs sent in a synchronization period;
   a time interval between two groups;
   a quantity of SSBs contained within each group;
   a quantity Q of groups contained within a synchronization period.

5. The signal transmission method according to claim 4, wherein the information carried by the PBCH comprises:
   information carried by a Demodulation Reference Signal DMRS corresponding to the PBCH, or information carried by a payload of the PBCH.

6. The signal transmission method according to claim 1, wherein the SSB is a sidelink synchronous signal block S-SSB, the PBCH is a physical sidelink broadcast channel PSBCH, the synchronous period is a sidelink synchronous period.

7. A signal reception method performed by a terminal, comprising:
   receiving P synchronous signal blocks SSBs in a synchronous period,
   wherein the P SSBs are divided into Q groups, any of the Q groups comprises at least one SSB, both P and Q are positive integers greater than or equal to 1;
   when a synchronization period comprises at least two SSBs, a time-domain location of at least one of the SSBs is preconfigured or carried through a physical broadcast channel PBCH,
   wherein when the time-domain location of the at least one of the SSBs is preconfigured, preconfigured information of the time-domain location comprises at least one of the following parameters:
   time intervals between two adjacent SSBs in a same group;
   time intervals between all SSBs in a same group and a first SSB in the group; or
   time intervals between all SSBs and a first SSB in a synchronization period;
   wherein the time interval is Ti slots or Ti milliseconds, Ti is greater than or equal to 0.

8. The signal reception method according to claim 7, wherein time intervals between two adjacent groups are same.

9. The signal reception method according to claim 7, wherein at least one of following parameters are preconfigured:
   a quantity of SSBs contained within each group;
   a value of P;
   a value of Q.

10. The signal reception method according to claim 7, wherein at least one of following parameters is determined according to at least one of a subcarrier spacing SCS used by the terminal, a frequency range, and information carried by the PBCH:
    a time-domain location of a SSB;
    a quantity P of SSBs sent in a synchronization period;
    a time interval between two groups;
    a quantity of SSBs contained within each group;
    a quantity Q of groups contained within a synchronization period.

11. The signal reception method according to claim 10, wherein the information carried by the PBCH comprises:
    information carried by a Demodulation Reference Signal DMRS corresponding to the PBCH, or information carried by a payload of the PBCH.

12. The signal reception method according to claim 7, wherein the SSB is a sidelink synchronous signal block S-SSB, the PBCH is a physical sidelink broadcast channel PSBCH, the synchronous period is a sidelink synchronous period.

13. A terminal, comprising:
    a transceiver, a processor, a memory storing a computer program executable by the processor;
    wherein, when the computer program is executed by the processor, the processor implements following:
    transmitting P synchronous signal blocks SSBs in a synchronous period,
    wherein the P SSBs are divided into Q groups, any of the Q groups comprises at least one SSB, both P and Q are positive integers greater than or equal to 1;
    when a synchronization period comprises at least two SSBs, a time-domain location of at least one of the SSBs is preconfigured or carried through a physical broadcast channel PBCH,
    wherein when the time-domain location of the at least one of the SSBs is preconfigured, preconfigured information of the time-domain location comprises at least one of the following parameters:
    time intervals between two adjacent SSBs in a same group;
    time intervals between all SSBs in a same group and a first SSB in the group; or
    time intervals between all SSBs and a first SSB in a synchronization period;
    wherein the time interval is Ti slots or Ti milliseconds, Ti is greater than or equal to 0.

14. The terminal according to claim 13, wherein, the SSB is a sidelink synchronous signal block S-SSB, the PBCH is a physical sidelink broadcast channel PSBCH, the synchronous period is a sidelink synchronous period.

15. A terminal, comprising:
    a transceiver, a processor, a memory storing a computer program executable by the processor;
    wherein, when the computer program is executed by the processor, the processor implements steps of the signal reception method according to claim 7.

16. The terminal according to claim 15, wherein,
    at least one of following parameters are preconfigured:
    a quantity of SSBs contained within each group;
    a value of P;
    a value of Q;
    or,
    at least one of following parameters is determined according to at least one of a subcarrier spacing SCS used by the terminal, a frequency range, and information carried by the PBCH:
    a time-domain location of a SSB;
    a quantity P of SSBs sent in a synchronization period;
    a time interval between two groups;
    a quantity of SSBs contained within each group;
    a quantity Q of groups contained within a synchronization period.

17. The terminal according to claim 15, wherein, the SSB is a sidelink synchronous signal block S-SSB, the PBCH is a physical sidelink broadcast channel PSBCH, the synchronous period is a sidelink synchronous period.

* * * * *